United States Patent
Hirsch et al.

(10) Patent No.: US 9,212,576 B2
(45) Date of Patent: Dec. 15, 2015

(54) FILTER DEVICE

(75) Inventors: Markus Hirsch, Isenbüttel (DE); Marco Stifel, Stuttgart (DE); Zhang Yuan, Shanghai (CN)

(73) Assignee: Mahle International GmbH (DE)

( * ) Notice: Subject to any disclaimer, the term of this patent is extended or adjusted under 35 U.S.C. 154(b) by 960 days.

(21) Appl. No.: 13/380,206

(22) PCT Filed: Jun. 18, 2010

(86) PCT No.: PCT/EP2010/058618
§ 371 (c)(1),
(2), (4) Date: Mar. 16, 2012

(87) PCT Pub. No.: WO2010/149582
PCT Pub. Date: Dec. 29, 2010

(65) Prior Publication Data
US 2012/0160756 A1    Jun. 28, 2012

(30) Foreign Application Priority Data

Jun. 24, 2009 (DE) .......................... 10 2009 030 561
Feb. 16, 2010 (DE) .......................... 10 2010 008 064

(51) Int. Cl.
*B01D 35/30* (2006.01)
*F01M 11/03* (2006.01)
(Continued)

(52) U.S. Cl.
CPC ............ *F01M 11/03* (2013.01); *B01D 27/106* (2013.01); *B01D 35/153* (2013.01); *B01D 2201/4023* (2013.01); *B01D 2201/4076* (2013.01); *F01M 2001/1064* (2013.01)

(58) Field of Classification Search
CPC .... B01D 35/16; B01D 35/153; B01D 27/106; B01D 2201/4023; B01D 2201/4076; F01M 11/03; F01M 2001/1064

USPC ........ 210/248, 435, 440, 443, 232, 249, 428, 210/429, DIG. 17
See application file for complete search history.

(56) References Cited

U.S. PATENT DOCUMENTS 6,706,181 B1   3/2004  Baumann et al.
7,507,339 B2   3/2009  Gilles et al.
(Continued)

FOREIGN PATENT DOCUMENTS

DE    3344568 A1    6/1985
DE    29916265 U1   2/2001
(Continued)

OTHER PUBLICATIONS

English abstract for DE-3344568.
(Continued)

*Primary Examiner* — Joseph Drodge
*Assistant Examiner* — Madeline Gonzalez
(74) *Attorney, Agent, or Firm* — Fishman Stewart Yamaguchi PLLC

(57) ABSTRACT

A filter may include a cover defining a chamber and an annular filter element arranged within the chamber. The filter may also include a housing and at least one intermediate piece arranged between the cover and the housing when the cover is screwed to the housing. An inlet duct may be in communication with an untreated side of the filter element and an outlet duct may be in communication with a clean side of the filter element. A drainage duct may be arranged in the housing for draining the chamber during removal of the cover. A closure device may be arrange in the intermediate piece and have a closure element configured to close the drainage duct.

19 Claims, 12 Drawing Sheets

(51) Int. Cl.
  *B01D 27/10* (2006.01)
  *B01D 35/153* (2006.01)
  *B01D 35/00* (2006.01)
  *F02M 37/22* (2006.01)
  *F01M 1/10* (2006.01)

(56) References Cited

U.S. PATENT DOCUMENTS

| | | | |
|---|---|---|---|
| 2008/0179238 A1* | 7/2008 | Foucault et al. | 210/348 |
| 2009/0078629 A1 | 3/2009 | Stemmer et al. | |
| 2011/0036766 A1 | 2/2011 | Monzie | |
| 2011/0042293 A1 | 2/2011 | Maier | |
| 2012/0168365 A1 | 7/2012 | Stifel et al. | |

FOREIGN PATENT DOCUMENTS

| | | |
|---|---|---|
| DE | 19951085 A1 | 4/2001 |
| DE | 102005057710 A1 | 6/2007 |
| DE | 202007002162 U1 | 12/2007 |
| DE | 102007062221 A1 | 6/2009 |
| DE | 202009002455 U1 | 7/2010 |
| EP | 1949950 A1 | 7/2008 |
| JP | 1-132207 | 9/1989 |
| JP | 2012-530872 A | 12/2012 |
| WO | WO-2009083285 A1 | 7/2009 |

OTHER PUBLICATIONS

English abstract for EP-1949950.
English translation of Japanese Office Action for JP2012-516662, dated Oct. 1, 2013.

* cited by examiner

FILTER DEVICE

CROSS-REFERENCES TO RELATED APPLICATION

This application claims priority to German Patent Applications 10 2009 030 561.0 filed on Jun. 24, 2009, 10 2010 008 064.0 filed Feb. 16, 2010 and PCT/EP2010/058618 filed on Jun. 18, 2010, which are hereby incorporated by reference in their entireties.

TECHNICAL FIELD

The present invention relates to a filter device for fluids, in particular an oil filter for the cleaning of lubricating oil for internal combustion engines of motor vehicles.

BACKGROUND

Filter devices, in particular oil filters for internal combustion engines of motor vehicles usually have a so-called annular filter element, by means of which a fluid flowing through the filter device is filtered. Periodically, this annular filter element must be exchanged in order to be able to always ensure the filtering action of the filter device. By removal of a filter device from the housing, the annular filter element is also removed. Owing to the constantly increasing environmental specifications, the exchange of the annular filter element must be possible here without fluid, in particular oil, arriving into the environment. For this reason, conventional filter devices have in their housing, in addition to an inlet duct which communicates with an untreated side of the annular filter element and an outlet duct which communicates with a clean side of the annular filter element, also a drainage duct, through which a receiving chamber, in which the annular filter element is arranged, can be drained on unscrewing of the filter device. Of course, this drainage duct must be closed off when the filter device is ready for operation, because otherwise the clean side and the untreated side of the annular filter element would be short-circuited with each other and thereby the filter device could not deploy its filtering action.

SUMMARY

The present invention is concerned with the problem of indicating for a filter device an improved or at least a different embodiment which makes possible an automatic opening or respectively closing off of a drainage duct on dismantling or respectively installing a filter device.

This problem is solved according to the invention by the subject matter of the independent Claim 1. Advantageous embodiments are the subject matter of the dependent claims.

The invention is based on the general idea of providing an intermediate piece between a filter device, arranged vertically, and a housing arranged therebeneath, into which intermediate piece a closure device is integrated. The closure device is constructed here so as to be rotatable about the filter axis of the annular filter element, wherein the annular filter element itself is arranged in a receiving chamber, which is delimited by a filter housing cover. On the housing side, an inlet duct and an outlet duct are provided, wherein the inlet duct communicates with an untreated side of the annular filter element and the outlet duct communicates with a clean side of the annular filter element. A drainage duct is likewise provided in the housing, through which the receiving chamber can be drained on unscrewing of the filter device, so that no filter fluid, in particular no oil, can arrive into the environment. The closure device, which is arranged so as to be rotatable about the filter axis, has a closure element, by means of which the drainage duct can be closed off when the filter device is screwed fully onto the housing. Generally, the closure device is constructed so that, on screwing on of the filter device on the housing, it is fixed in a precisely defined position in which the closure element is arranged aligned to the drainage duct and is able to be adjusted into a position closing off the drainage duct by the screwing on of the filter device. In contrast to this, the closure device on unscrewing of the filter device from the housing is twisted and is moved at the same time axially away from the housing, so that the closure element on unscrewing of the filter device from the housing frees the drainage duct and makes possible a drainage of the intermediate piece and, if applicable, of the receiving chamber containing the annular filter element. Through the closure device according to the invention, which can be constructed for example as a favourably-priced plastic part with a closure element made of a different plastic, it is possible in the technically simplest manner to reliably close off the drainage duct with the filter device screwed on fully on the housing, and thereby to ensure a problem-free functioning of the filter device, wherein on an unscrewing of the filter device from the housing the drainage duct is automatically opened, so that the receiving chamber containing the annular filter element can drain and no filter fluid arrives into the environment. A separate opening or respectively closing of the drainage duct, connected with the possibility of forgetting this, can be reliably ruled out by the filter device according to the invention, whereby the maintenance process is to be arranged to be distinctly more reliable and in addition easier to arrange. Through the precisely fixed position of the closure device during the screwing-on process of the filter device on the housing, furthermore a laborious positioning or respectively aligning of the closure element with respect to the drainage duct which is to be closed off can be dispensed with, wherein it is always ensured that the drainage duct is reliably closed off with the filter device fully screwed on the housing.

Expediently, the closure device is constructed as a plate and the closure device is constructed as a cap with a plate mounted rotatably therein, and the plate has a perforated lateral edge with openings. When the filter device is screwed on, a compression of the spring element then takes place, whereby an axial displacement of the closure element towards the drainage duct is prevented, so that the closure element rests on an opening of the drainage duct, and namely such that the drainage duct is tightly closed off.

In a further advantageous embodiment of the solution according to the invention, the plate, on screwing on of the filter device with at least one rib, arranged on at least one lateral part of a perforated lateral wall, engages on the incline of the cap and through a further screwing on of the filter device is displaceable into its position closing off the drainage duct.

In a further advantageous embodiment of the solution according to the invention, between the intermediate piece and the annular filter element arranged thereabove, a disc-like base and a simple spring element are provided, wherein the base has several through-openings distributed in circumferential direction. The non-co-rotation of the closure device on unscrewing of the filter housing cover from the housing brings about a lifting of the closure element and hence an axial displacement of the closure device together with the closure element, so that the closure element frees the opening of the drainage duct. The closure device therefore behaves completely differently in the screwing process or respectively unscrewing process of the filter device on/from the housing.

On screwing of the filter device on the housing, the closure device, i.e. the spring arranged between closure device and base, is compressed until the closure element, arranged on the closure device, lies tightly on the drainage duct. Thereby, on screwing of the filter device on the housing, a reliable closing off of the drainage duct can be brought about, and on unscrewing of the filter device from the housing, a reliable opening and hence draining of the receiving chamber can be brought about. This ensures, on the one hand, a high functional reliability of the filter device, and on the other hand an emergence of filter fluid into the environment can be reliably avoided, because the drainage duct is preferably already fully opened with few rotations of the filter device, so that the receiving chamber can drain completely before the filter device is removed through further rotations.

The emergence of fluid into the environment can be additionally prevented by an external axially and radially acting sealing combination, which ensures the closure function of the filter device with respect to the housing even when the flat seal has no contact to the housing.

Further important features and advantages of the invention will emerge from the sub-claims, from the drawings and from the associated description of figures with the aid of the drawings.

It is to be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
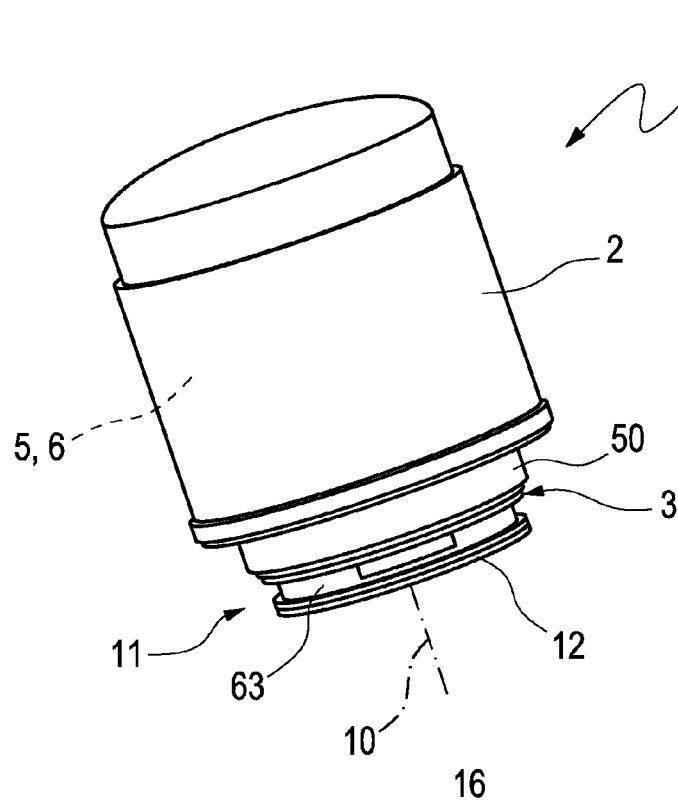
FIG. 1 shows an external view of the filter device according to the invention

In FIG. 1 the filter device 1 can be seen from the exterior. It consists of a filter housing cover 2; the latter forms in its interior a receiving chamber 5 in which the annular filter element 6 is arranged so that it separates a clean side from an untreated side. The internal structure is that of a conventionally used exchangeable filter which is suitable for the filtering of oil. An intermediate piece 3 is situated on the side of the filter device 1 facing the housing 4. The housing 4, on which the filter device 1 is securely screwed, can be, for example, a motor block housing or a cylinder housing. For the sake of simplicity, it is only named as housing 4. The housing 4 is configured so that it has a dome 15 with thread, and the inlet duct 7, the outlet duct 8 and the drainage duct 9 (see FIG. 9).

Figure 2:
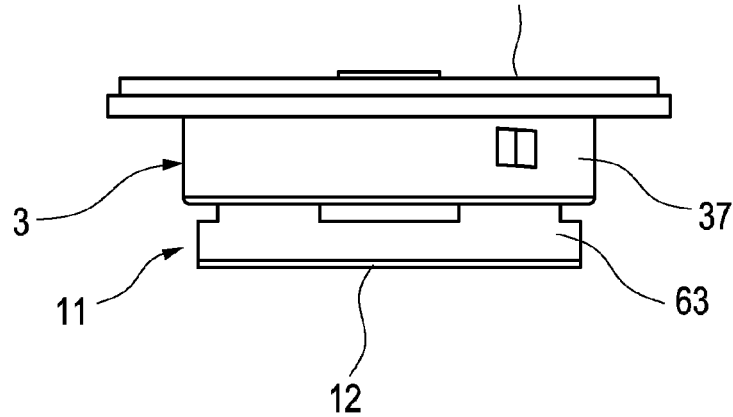
FIG. 2 shows a detail of the external view

In FIG. 2 the intermediate piece 3 is shown, which is tightly flanged with the filter housing cover 2 at the transition of the two parts. The intermediate piece 3 consists of an outer cap 37 and internal plate 63.

Figure 3:
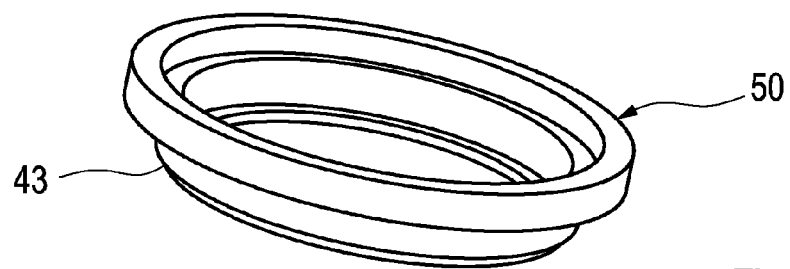
FIG. 3 shows an external seal

In FIG. 3 the seal 50 is shown, lying externally around the cap 37, which seal has in the direction of the housing 4 a lip 43, lying externally against the cap 37, having a radial sealing effect. This seal 50 seals in general the filter device 1 with respect to the environment, so that during the operation of the vehicle and on unscrewing of the filter device, no oil can arrive into the environment. To receive the seal 50, an annular groove 47, open in axial direction, is provided in the cap 37 in the region of the connection between filter housing cover 2 and cap 37 (see FIG. 5).

Figure 4:
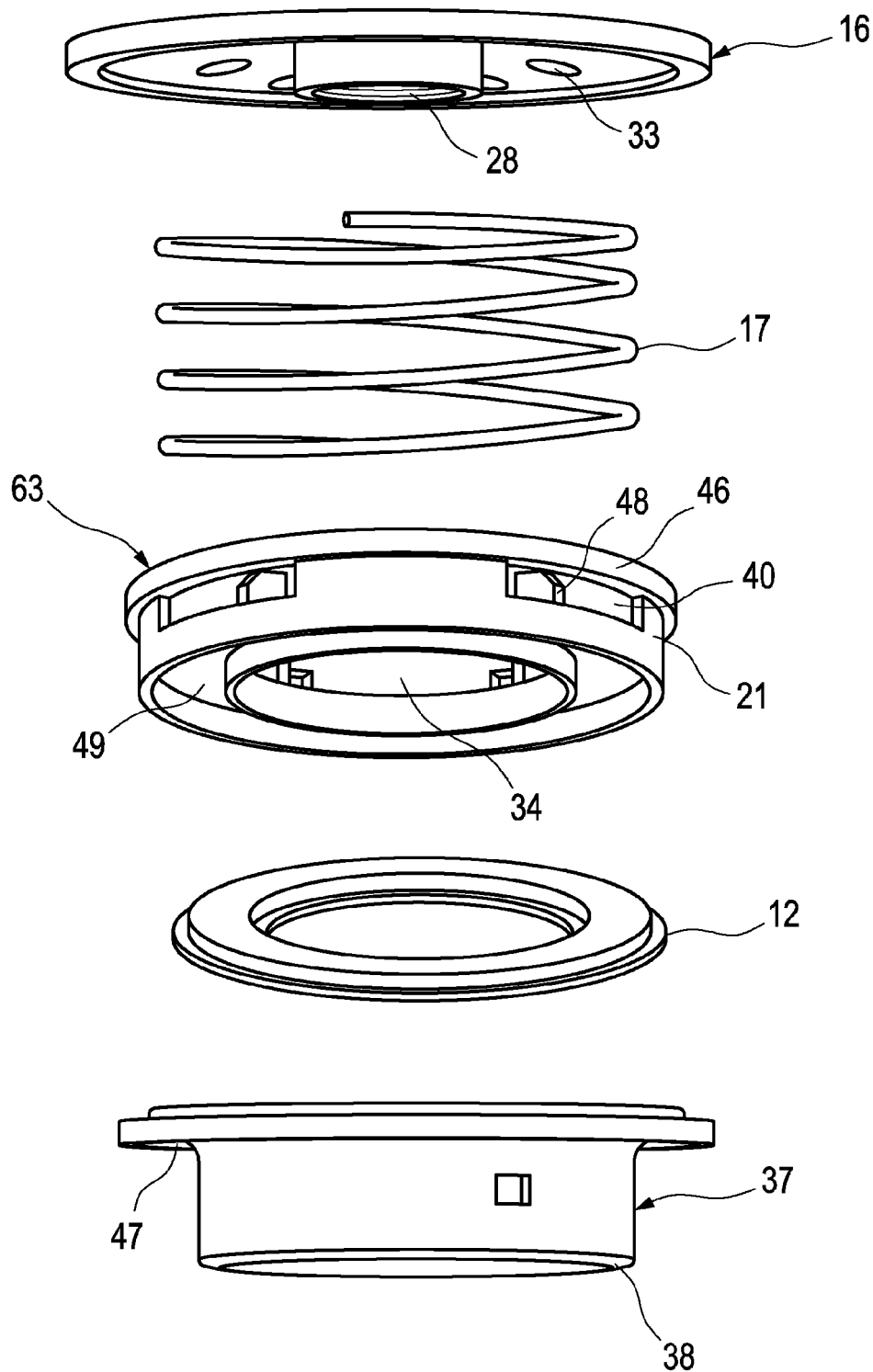
FIG. 4 shows the detail as exploded illustration

In FIG. 4 the individual parts which together form the intermediate piece 3, and further parts are illustrated. A base 16, which has through-openings 33 through which oil can arrive into the receiving chamber 5, forms the closure of the receiving chamber 5. The central opening 34 has a thread or a threaded hollow pin, so that the filter device 1 can be screwed securely on the dome 15 of the housing 4. Between the base 16 and plate 63 there is a spring element 17, a conventional spiral spring in the example which is shown, but any suitable spring element 17 can be used. The spring element 17 has a bearing surface internally on the plate 63. The plate 63 has a central opening 34 and a lateral edge 21, which is perforated by openings 40. The openings 40 are connected at their upper end by a connecting cross-piece 46, which projects slightly in radial direction and thus forms a stop for the plate 63. This stop forms at the same time the mounting of the plate 63 in the cap 37. For this purpose, the cap 37 has an unbent edge 38 at the lower end. The plate 63 also has a flat annular groove 49 on the side facing the housing, into which the closure element 12 is inserted in the form of a flat O-ring seal. The sealing material can also be injected into the annular groove 49. The precise shape of the closure element 12 is dependent on the respective case of application.

All the named parts of the filter device 1, except for the annular filter element 6 and the seals, can be made from metal or else from suitable plastics; in the latter case, however, the cap 37 would not be flanged with the filter housing cover 2, but welded.

Figure 5:
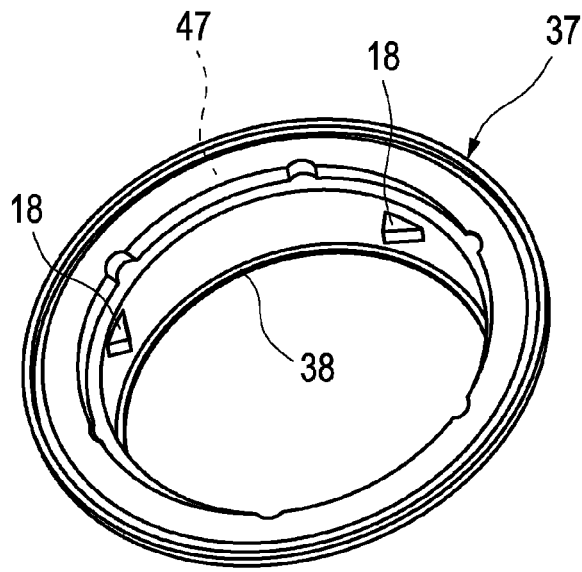
FIG. 5 shows a detail in the top view from above
Figure 6:
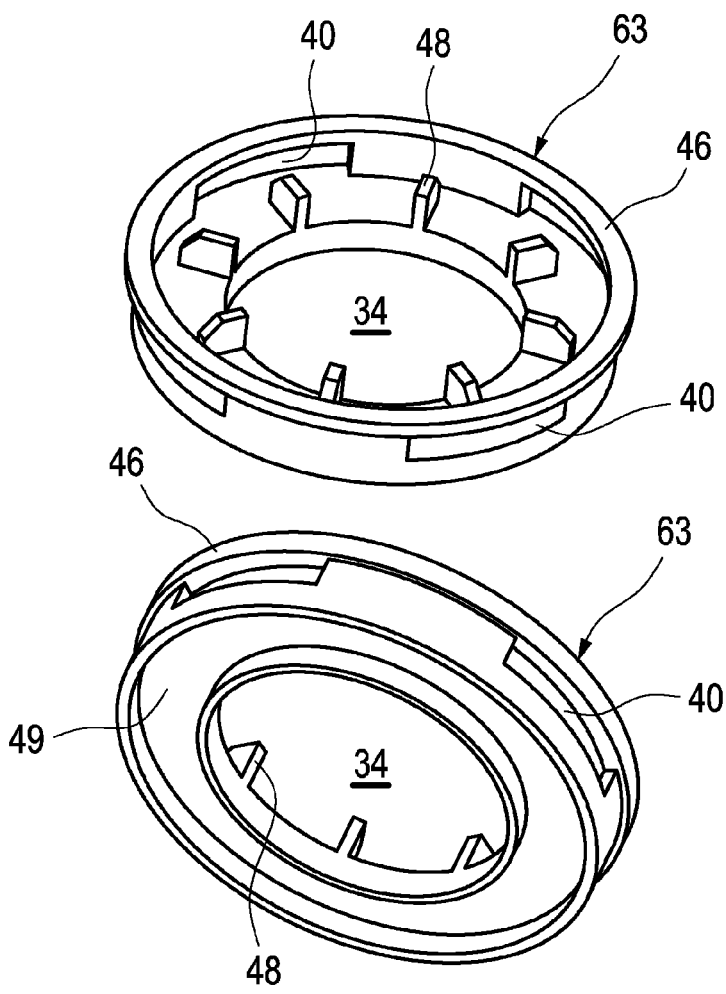
FIG. 6 shows the plate in two views a) and b)

The cap 37 and the plate 63 are illustrated again in detail in FIGS. 5 and 6. At least one projection 18 is situated in the cap 37. The plate 63 is mounted so as to be rotatable as desired in the cap 37. In the plate 63 on the inner side at least one delimiting nub 48 is arranged, which hold the spring element 17 in its place.

Figure 7:
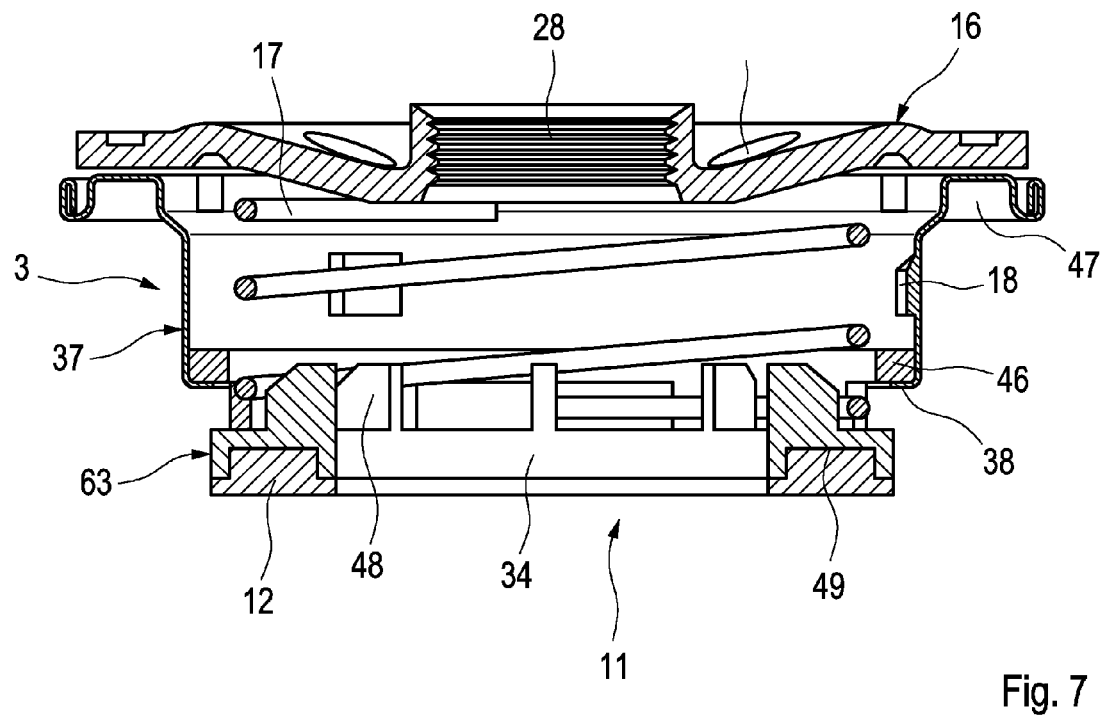
FIG. 7 shows a section through the lower end of the filter device

FIG. 7 shows a section through the lower end of the filter device 1. It can be seen here how it is assembled. In this example embodiment, the projections 18 form an upper stop for the plate 63, so that the plate 63 can not be pressed into the cap 37.

Figure 8:
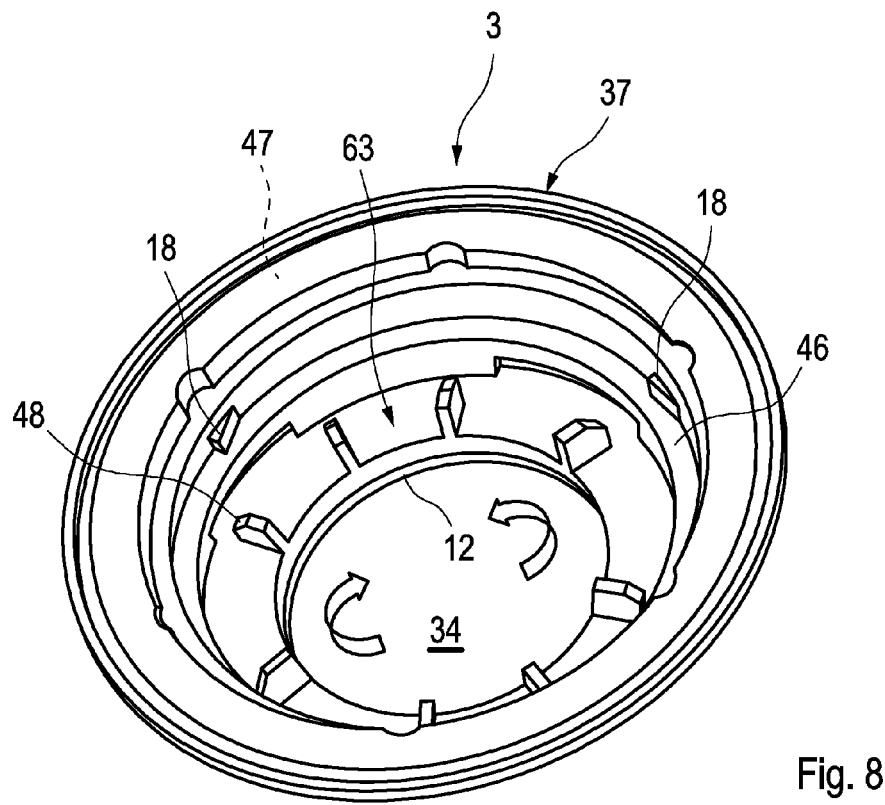
FIG. 8 shows the cap and the plate together

In FIG. 8 an oblique top view is to be seen onto the plate 11, which is mounted rotatably in the cap 37. As the two arrows indicate, the plate is freely movable in both directions of rotation.

Figure 9:
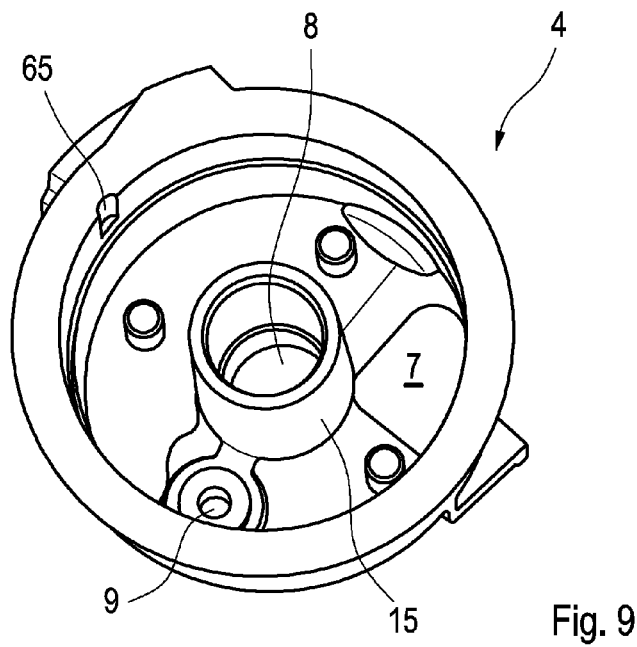
FIG. 9 shows the housing

In FIG. 9 an oblique top view is to be seen onto the housing 4. The inlet duct 7, the outlet duct 8 and the drainage duct 9 can be seen.

In FIG. 9 a ventilation opening is designated by 65, through which, on unscrewing of the cover 2, air can enter from the exterior into the receiving chamber 5, but no oil can emerge.

Figure 10:
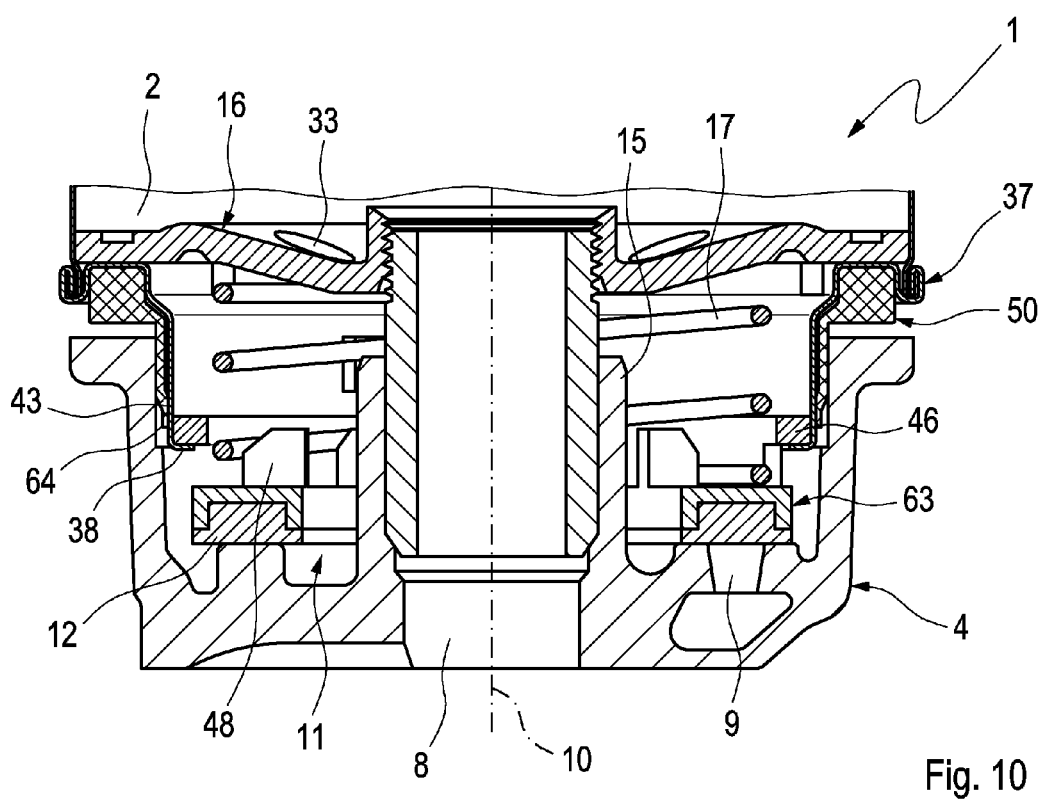
FIG. 10 shows a section through the filter device on screwing on onto the housing

In FIG. 10 the housing 4 is illustrated in section with filter device 1 during screwing on. On screwing on, the plate 63 can be co-rotated, because it is rotatably mounted in the cap 37. However, the plate 63 can also only be moved axially whilst the filter device 1 is screwed on. When the closure element 12 comes to lie on the opening of the drainage duct 9, the plate 63 no longer co-rotates further with the filter device 1. The filter device 1 is further screwed securely until the seal 50 also comes to lie against the housing 4, meanwhile the plate 63 is at rest. In this way, it is avoided that the seal 12 rubs over the opening of the drainage duct 9. The lip 43 which is formed onto the seal 50 now lies against the inner wall of the mounting of the housing 4 and seals the filter device with respect to the environment.

According to FIG. 10, the seal 50 can have an, in particular cylindrical, extension 43 or section 43, which projects axially into an annular space 64 which is produced between the intermediate piece 3 or respectively the cap 37 and the housing 4, when the cover 2 is screwed on, wherein the extension 43, on unscrewing of the cover 2, also still seals radially when the axial seal of the sealing element 50 is eliminated by lifting from the housing 4.

Figure 11:
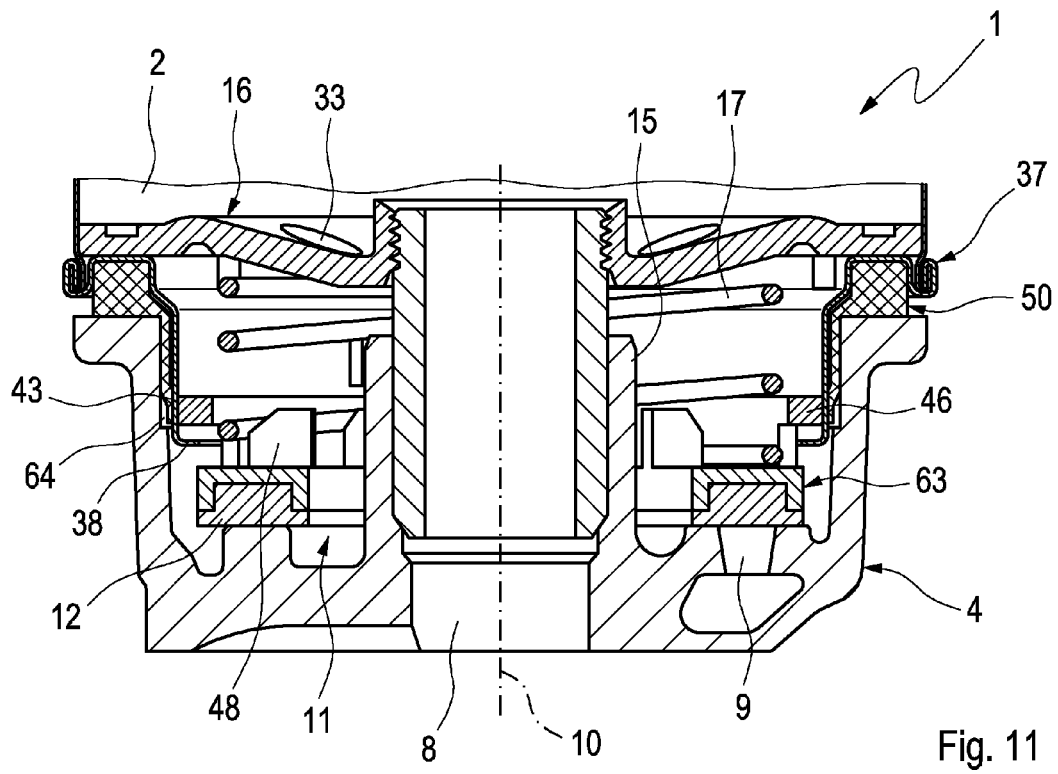
FIG. 11 shows a section through the filter device in the screwed on state
Figure 12:
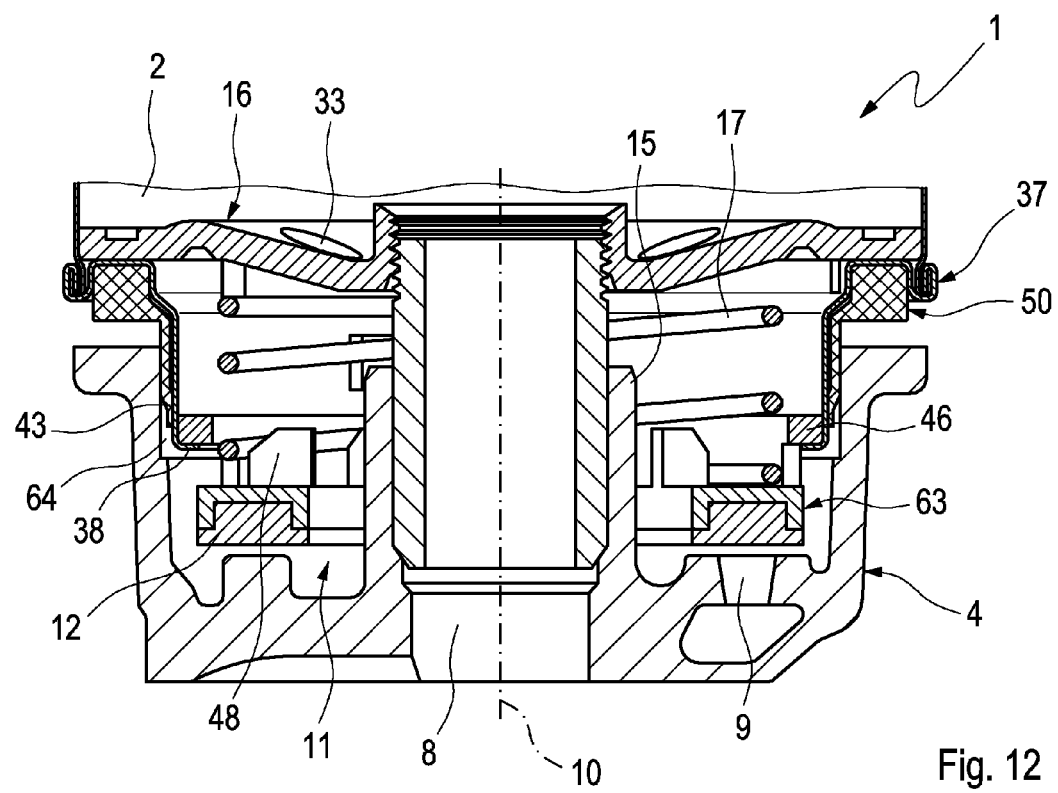
FIG. 12 shows a section through the filter device on unscrewing from the housing

In FIG. 11 the filter device is shown in the screwed on state. By screwing tightly, the connecting cross-piece 46 of the plate 63 is lifted from the bent edge 38 of the cap 37. The spring element 17 presses the closure element 12 onto the opening of the drainage duct 9.

On unscrewing of the filter device 1 from the housing 4, the plate 63 is not moved together with the filter device 1, because it is rotatably mounted in the cap 37. After one to two rotations of the filter device, the edge 38 of the cap 37 takes up the connecting cross-piece 46 of the plate 63 again, so that the drainage opening of the drainage duct 9 is freed, and the oil can flow off out from the receiving chamber 5 of the filter device 1 via the drainage duct 9 before the filter device 1 is unscrewed from the housing.

Figure 13:
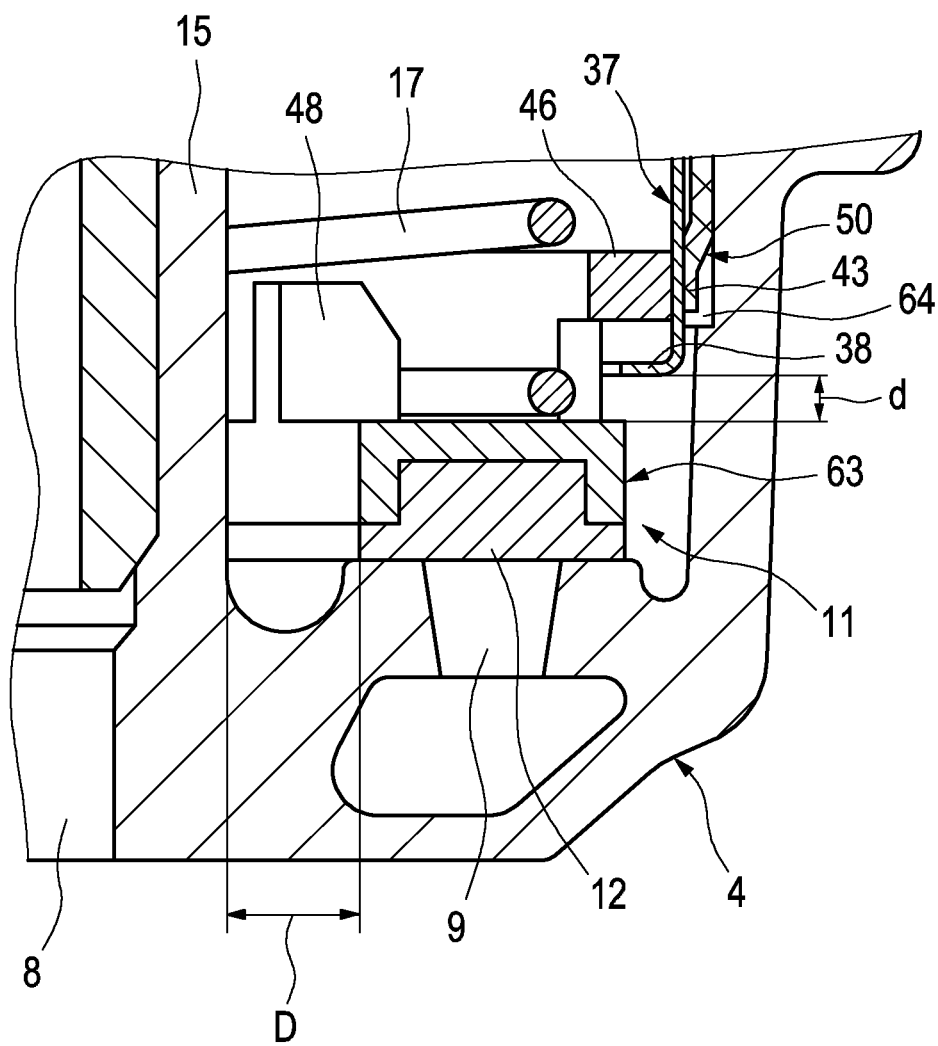
FIG. 13 shows a detail of FIG. 11
Figure 14:
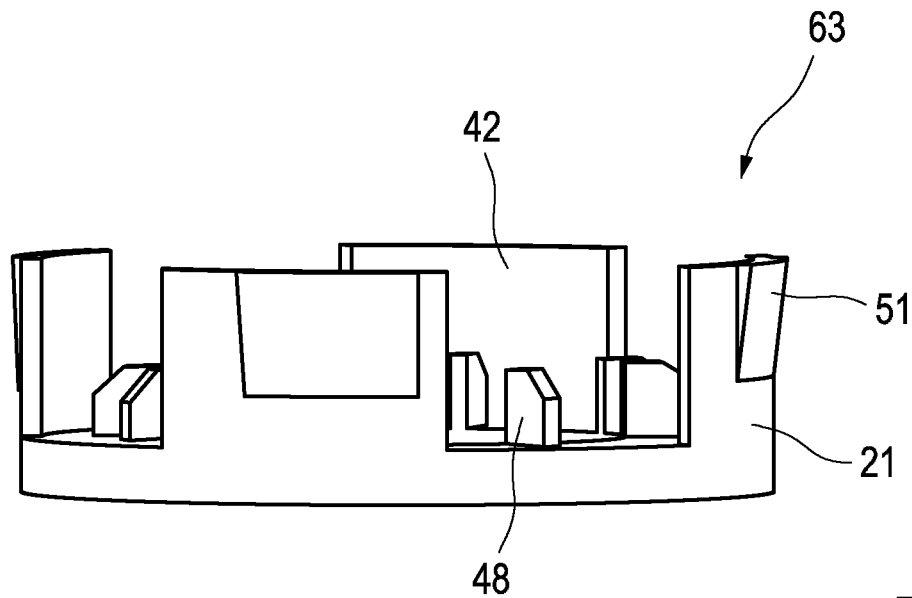
FIG. 14 shows an alternative embodiment
Figure 15:
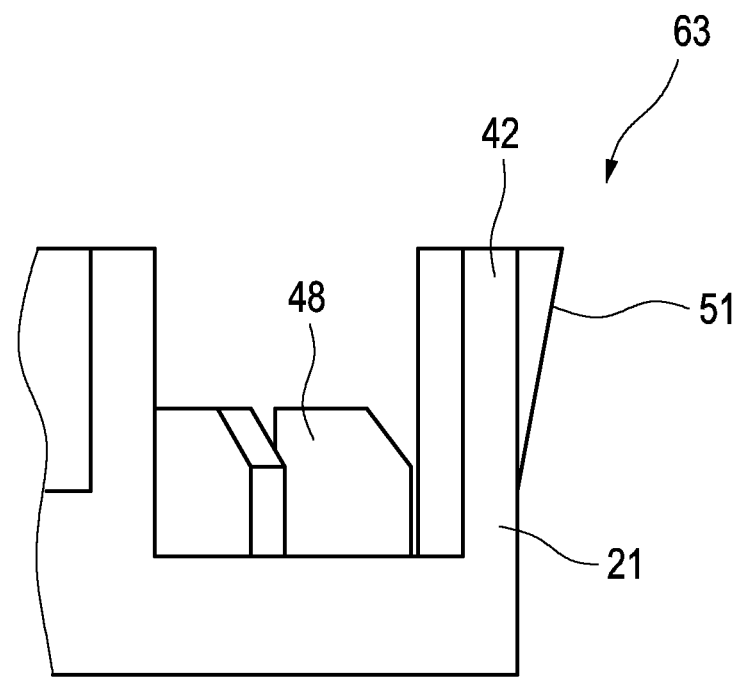
FIG. 15 shows a cut-out of the plate of FIG. 14
Figure 16:
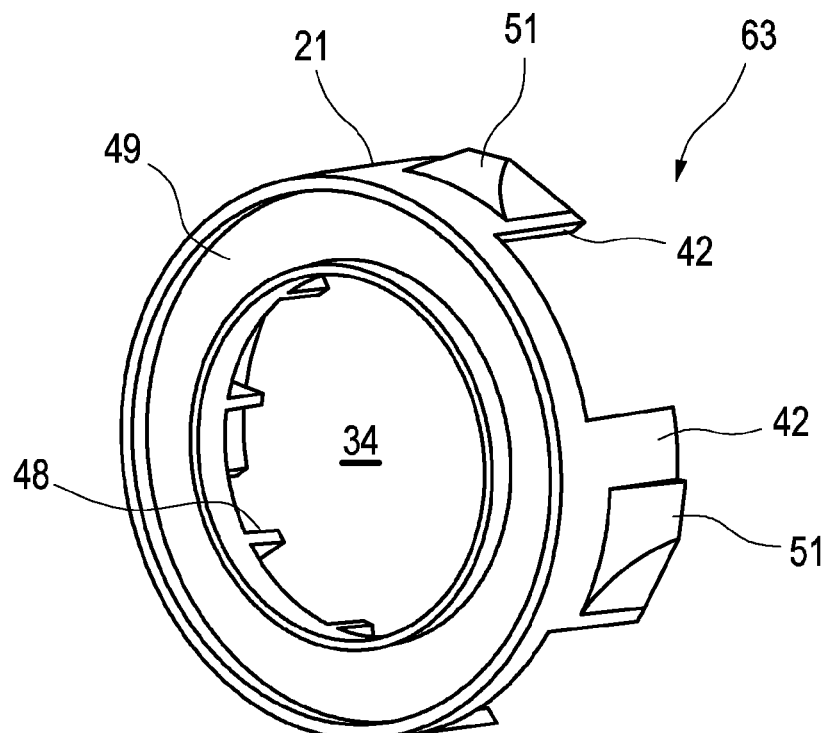
FIG. 16 shows a view of the plate of FIG. 14 from below
Figure 17:
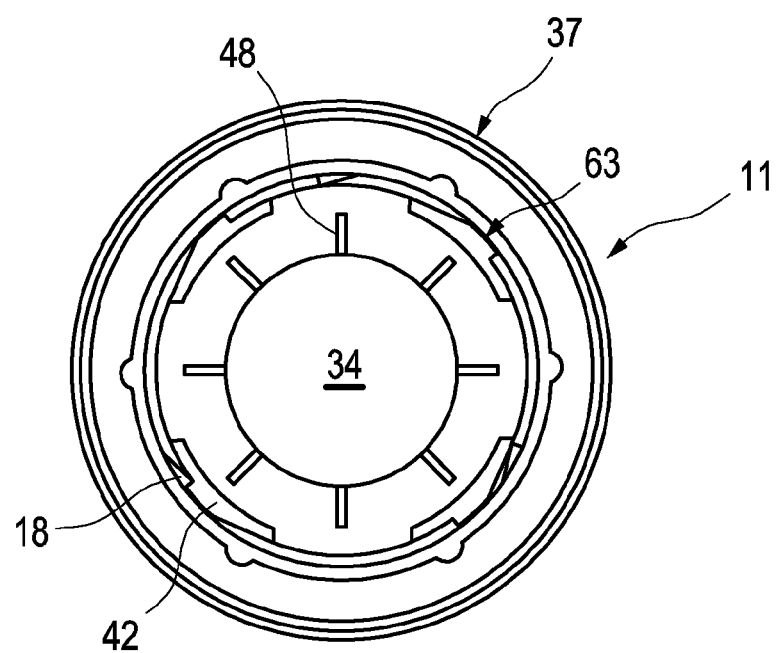
FIG. 17 shows a view of the plate of FIG. 14 with cap
Figure 18:
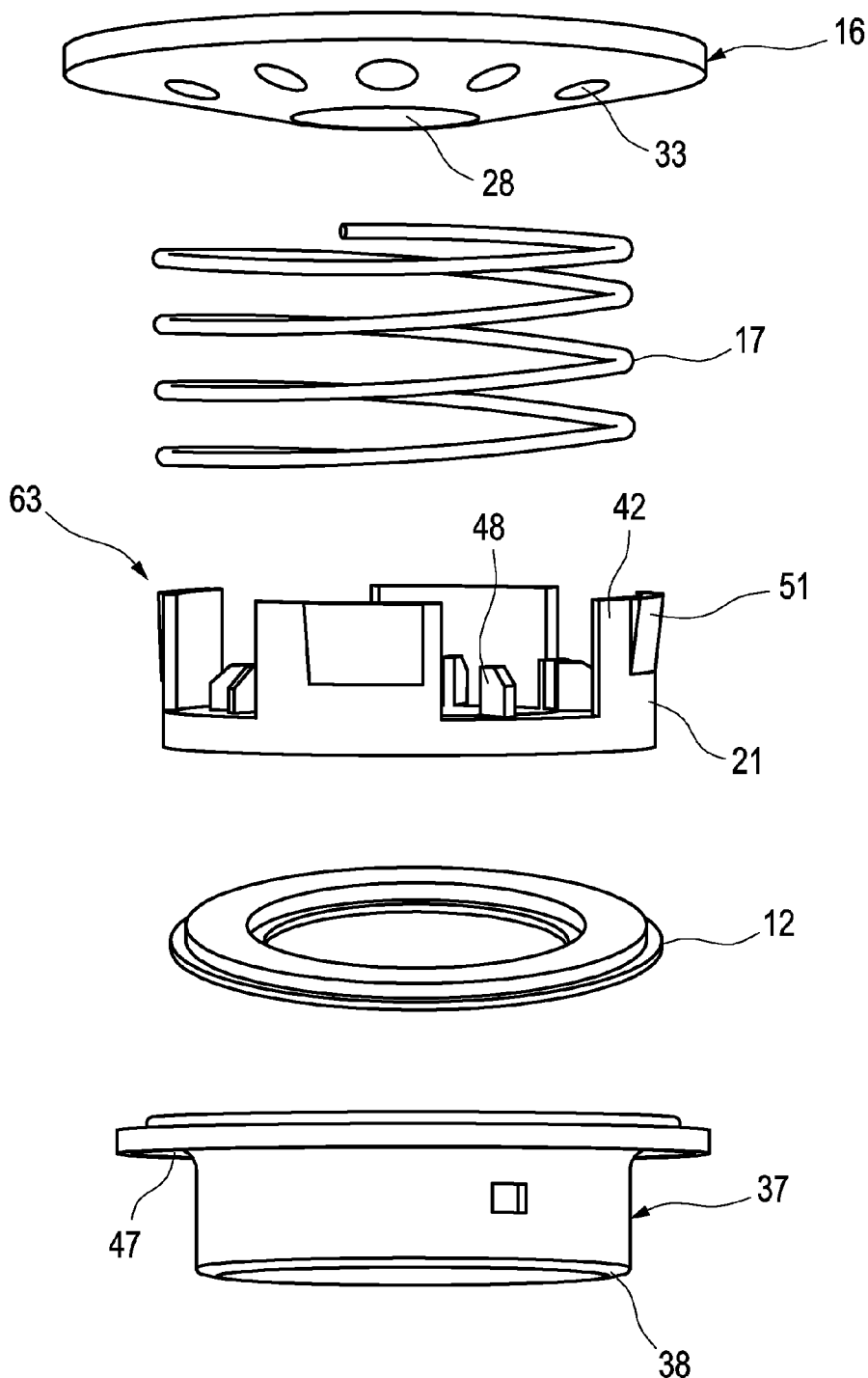
FIG. 18 shows a further alternative embodiment in exploded illustration
Figure 19:
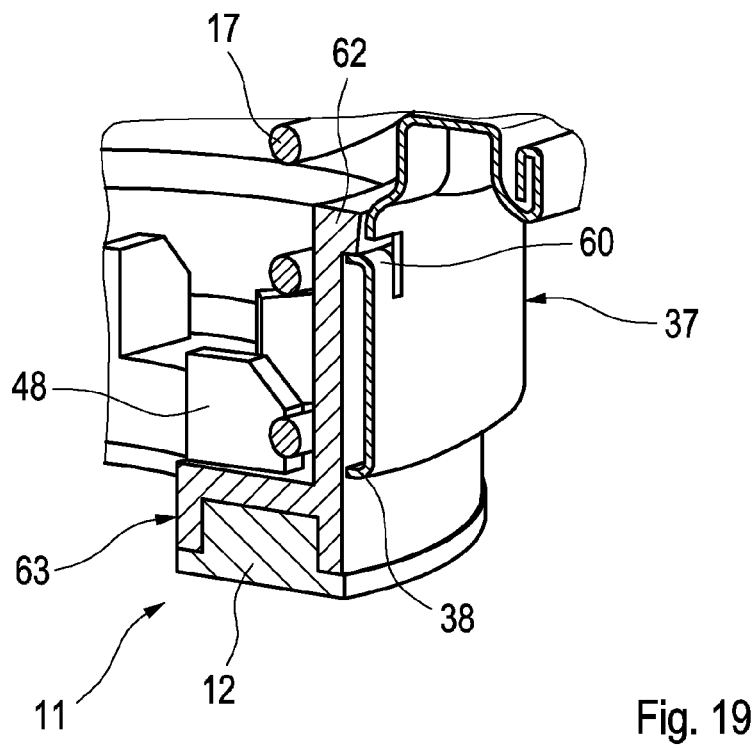
FIG. 19 shows the lower end of the filter device to the further embodiment
Figure 20:
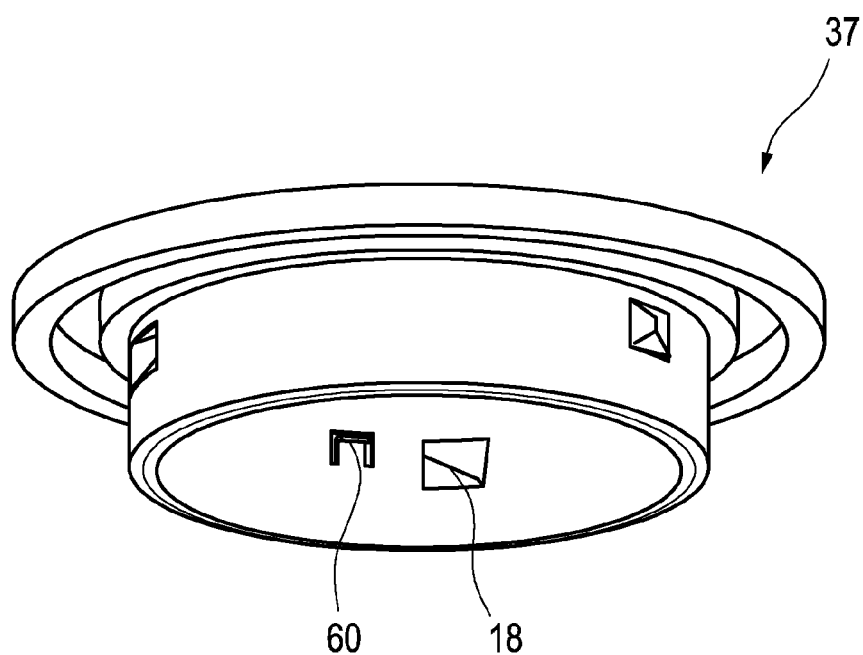
FIG. 20 shows the cap of the further embodiment
Figure 21:
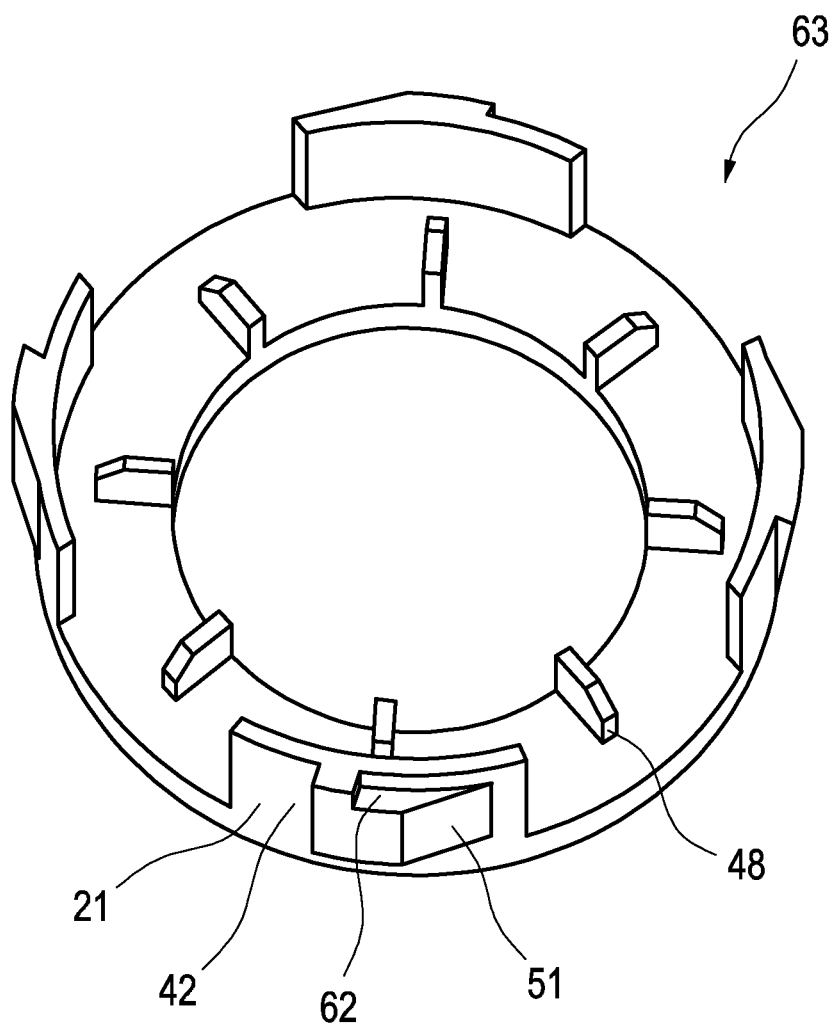
FIG. 21 shows the plate of the further embodiment.

In FIG. 13 a detail of FIG. 11 can be seen, where the filter device 1 is securely screwed on the housing 4. The distances d and D determine the pressure loss of the oil on flowing through the filter device 1 in operation.

In FIGS. 14 to 17 an alternative embodiment can be seen. Here, likewise, the lateral wall 21 of the plate 63 is perforated. An incline 51 is situated on at least one partial piece 42 of the lateral wall 21. On the one side, the incline 51 has a continuously rising surface, on the other side a straight edge which stands perpendicularly on the circumference of the lateral wall 21.

These inclines 51 cooperate with the projections 18 of the cap 37 in a form such that through the edge of the inclines 51 and thereby the entrainment of the plate 11 on unscrewing of the filter device 1 is guaranteed. Through the incline rise, the elastic force of the spring element 17 is overcome. The plate 11 is lifted here axially independently of the thread pitch. On unscrewing of the filter device 1, the drainage opening of the drainage duct 9 is freed, so that the oil can flow off out from the receiving chamber 5, before the seal 50 has axially left the contact surface of the housing 4, i.e. distinctly before the filter device 1 is unscrewed fully from the housing 4.

On screwing on of the filter device 1, the plate 63 is contingently mounted rotatably in the cap 37. When the closure element 12 rests on the drainage opening of the drainage duct 9, the plate 63 no longer moves axially and it also no longer co-rotates with the filter device 1.

The filter device 1 is then still screwed securely onto the housing. Thereby, there is no friction of the closure element 12 on the drainage opening. The drainage opening of the drainage duct 9 is tightly closed off through the elastic force of the spring element 17 which presses the closure element 12 onto the housing 4. The edge 38 of the cap 37 lies at a suitable location against the outer circumference of the plate 63, so that the plate 63 does not fall out from the cap 37 on mounting of the filter device 1.

In FIGS. 18 to 21, a further embodiment is illustrated. Here, the lateral parts 42 of the perforated lateral edge 21 of the plate 63 have a projection 62, against which a bent projection 60, 62 of the cap 37 lies and namely such that the plate 63 is not pressed again inadvertently onto the opening of the drainage duct. This bent projection 60, 62 also comes into effect when the plate 63, compared with the cap 37, is rotated, does not move with the filter device, then the projection 61, 62 lies on the bent edge 38 of the cap 37 and in this position prevents the lowering of the plate 63 onto the drainage duct. On unscrewing of the filter housing cover 2, the inclines 51 cooperate again with the projections 18 in the cap 37 and thus overcome the elastic force of the spring element 17, so that the drainage opening of the drainage duct 9 is freed, before the seal 50 has axially left the contact surface of the housing 4 and the filter device 1 is completely unscrewed. The number of projections 60, 61, 62 is able to be selected as desired.

On screwing on of the filter housing cover 2, this embodiment behaves like the other two embodiments.

The invention claimed is:
1. A filter device comprising:
a filter housing cover defining a receiving chamber, and an annular filter element arranged within the receiving chamber,
a housing including a threaded dome arranged centrally in the housing to which the filter housing cover is rotatably secured,
at least one intermediate piece arranged between the filter housing cover and the housing when the filter housing cover is secured to the housing, wherein the intermediate piece defines a cap having a surrounding wall enclosing an axially open cavity,
a housing-side inlet duct in communication with an untreated side of the annular filter element, and a housing-side outlet duct in communication with a clean side of the annular filter element,
a housing-side drainage duct arranged in the housing and through which the receiving chamber can be drained during the removal of the filter housing cover,
a closure device arranged coaxially in the cap of the intermediate piece and rotatable about a filter axis, the closure device having a closure element configured to close the drainage duct, wherein the closure device includes an annular plate and a lateral wall extending axially therefrom surrounding a central opening, wherein the lateral wall is perforated in a circumferential direction via a plurality of openings,
wherein the plate is arranged in alignment to the drainage duct and by rotating the housing in a first direction relative to the filter housing cover the plate axially adjusts into a first position closing off the drainage duct via the closure element, and by rotating the housing in a second direction relative to the filter housing cover the plate is rotated and moved axially away from the housing into a second position such that the closure element opens the drainage duct.

2. The filter device according to claim 1, wherein the cap includes an edge on an axial end positioned towards the housing, wherein the edge projects from the surrounding wall into the cavity, and the closure device further includes a circumferentially extending cross-piece enclosing at least one of the plurality of openings in the lateral wall, wherein the cross-piece projects radially away from the filter axis and is configured to engage the edge of the cap.

3. The filter device according to claim 2, wherein the cross-piece of the plate is axially spaced away from the edge of the cap in the first position and engages the cap in the second position.

4. The filter device according to claim 3, further comprising a spring element arranged between the filter housing cover and the plate, wherein the spring element axially biases the closure element towards the housing to close off the drainage duct in the first position.

5. The filter device according to claim 2, wherein the cap has at least one limit projecting from the surrounding wall towards the filter axis and positioned axially spaced from the edge, and wherein the cross-piece of the closure device is arranged in the cap between the at least one limit and the edge.

6. The filter device according to claim 5, wherein the plate of the closure device has an annular groove which is open in an axial direction towards the housing and further wherein the closure element is arranged in the annular groove.

7. The filter device according to claim 1, further comprising at least one rib arranged on a side of the perforated lateral wall facing away from the filter axis, wherein the at least one rib engages the cap at an incline of the cap and through rotating the housing in the first direction relative to the filter housing cover, the plate is displaced into the first position closing off the drainage duct.

8. The filter device according to claim 1, further comprising an annular base arranged between the intermediate piece and the annular filter element closing the receiving chamber, the base having a plurality through-openings distributed in a circumferential direction for communicating a fluid to the receiving chamber.

9. The filter device according to claim 8, further comprising a spring element arranged between the plate of the closure device and the base, which axially biases the closure element onto the drainage duct.

10. The filter device according to claim 8, wherein the base includes a threaded central opening to which the threaded dome of the housing is rotatably secured.

11. The filter device according to claim 1, wherein the closure element is composed of a plastic which is resistant to lubricating oil.

12. The filter device according to claim 1, wherein the plate of the closure device has an annular groove which is open in an axial direction towards the housing, and further wherein the closure element is arranged in the annular groove.

13. The filter device according to claim 1, wherein the intermediate piece has an annular groove which is open in an axial direction towards the housing and a sealing element being arranged in the annular groove, the sealing element configured to seal the intermediate piece with respect to the housing in the first position.

14. The filter device according to claim 13, wherein the sealing element includes a section that projects axially into a radial annular space between the intermediate piece and the housing.

15. The filter device according to claim 1, wherein the closure element is composed of at least one of plastic and metal.

16. The filter device according to claim 1, wherein the lateral wall of the closure device includes a circumferentially extending cross-piece enclosing the plurality of openings.

17. The filter device according to claim 16, wherein the plate of the closure device has an annular groove which is open in an axial direction towards the housing and further wherein the closure element is arranged in the annular groove.

18. The filter device according to claim 17, wherein the intermediate piece has an annular groove which is open in the axial direction towards the housing, and a sealing element arranged in the annular groove and configured to seal the intermediate piece with respect to the housing in the first position.

19. The filter device according to claim 18, wherein the closure element is composed of at least one of plastic and metal.

* * * * *